United States Patent [19]

Carobolante et al.

[11] Patent Number: 5,656,897
[45] Date of Patent: Aug. 12, 1997

[54] CURRENT SENSING AND CONTROL IN BRUSHLESS DC MOTORS

[75] Inventors: Francesco Carobolante, Scotts Valley; Karl Schlager, Campbell; Li-Hsin D. Lu, San Jose, all of Calif.

[73] Assignee: SGS-Thomson Microelectronics, Inc., Carrollton, Tex.

[21] Appl. No.: 315,924

[22] Filed: Sep. 30, 1994

[51] Int. Cl.$^6$ ............................................. H02K 23/00
[52] U.S. Cl. ............................ 318/254; 318/138; 318/439; 318/771
[58] Field of Search ..................... 318/254, 138, 318/439, 771; 307/112, 131; 363/41, 55, 56, 132, 136, 54, 58, 128

[56] References Cited

U.S. PATENT DOCUMENTS

| | | | |
|---|---|---|---|
| 4,337,423 | 6/1982 | Giordano | 318/254 X |
| 4,527,102 | 7/1985 | Gotou | 318/254 |
| 4,827,207 | 5/1989 | Chieli | 323/316 |
| 4,912,393 | 3/1990 | Anderson et al. | 307/112 X |
| 4,922,131 | 5/1990 | Anderson et al. | 307/131 X |
| 5,204,594 | 4/1993 | Carobolante | 318/254 |
| 5,220,207 | 6/1993 | Kovalcik et al. | 307/350 |
| 5,306,988 | 4/1994 | Carobolante et al. | 318/254 |
| 5,455,885 | 10/1995 | Cameron | 318/771 X |

*Primary Examiner*—Karen Masih
*Attorney, Agent, or Firm*—Theodore E. Galanthay; Lisa K. Jorgenson

[57] ABSTRACT

A motor drive system, and method for operating the same, which includes current mirror load current sensing, is disclosed. Sensed current is used in the well known manner to control the low side drive of the motor. The disclosed motor system operates in a bipolar mode on startup, and in a unipolar mode during full speed operation. In unipolar mode, a current mirror transistor is provided to sense the load current through the center tap drive transistor in a continuous manner. Ripple in the sensed current is avoided, as the center tap drive transistor is not commutated during motor operation in unipolar mode. In bipolar mode, current mirrors are provided for both of the high side and low side drive transistors in each leg, with the currents summed for each coil at a sum node, and with the summed current applied to a cumulative sum node; the summed current never drops to zero, as only one drive transistor changes in each phase change in the commutation sequence.

18 Claims, 8 Drawing Sheets

CURRENT SENSING AND CONTROL IN BRUSHLESS DC MOTORS

This invention is in the field of motor control, and is more particularly directed to current sensing techniques useful therein.

BACKGROUND OF THE INVENTION

In the field of driver circuitry used for driving the coils of motors of the DC brushless type, it is well known to control the drive current applied to the driven coil using feedback from the load current that is supplied to the driven motor coils. Such feedback control allows precise control of motor torque and motor position, which is especially useful in certain motor applications, such as disk drive motors in modern computers.

A typical conventional technique for sensing the load current in a motor control system is the use of a small series sensing resistor, connected in series with the motor coils being driven. Measurement of the voltage drop across the resistor will, of course, indicate the magnitude of the current through the driven coil at each particular instant.

An example of the use of a sensing resistor in the field of motor control, is shown in FIG. 1 hereof. In this example, which is described in detail in U.S. Pat. No. 5,306,988, issued Apr. 26, 1994, assigned to SGS-Thomson Microelectronics, Inc. and incorporated herein by this reference, a brushless DC motor includes stator (or, alternatively, rotor) coils 2, 3, 4, connected to a center tap 6 in the conventional "Y" arrangement. Driver circuit 5 includes, for each of motor coils 2, 3, 4, a pull-up transistor 14 and a pull-down transistor 15. The gates of pull-up transistors 14, 14', 14" (for motor coils 2, 3, 4, respectively) are driven by lines from a commutation sequencer. The gates of pull down transistors 15, 15', 15" (for motor coils 2, 3, 4, respectively), are driven by a respective power switch 7, 7', 7", under control of the commutation sequencer. Sensing resistor 9 is connected between the sources of transistors 15, 15', 15" and ground; the voltage across resistor 9 is amplified by constant gain circuit 8, and applied to error amplifier 10 along with a reference voltage $V_{IN}$. The output of error amplifier 10, which is a voltage proportional to the differential voltage at its inputs, is provided to each of power switches 7, 7', 7". During a commutation sequence, the one of pull-down transistors 15 that is to be turned on will have the output voltage of error amplifier 10 applied to its gate. As such, the current sensed by resistor 9 determines the amount of low side drive applied by driver circuit 5.

Another implementation of current sensing by way of a sensing resistor is described in U.S. Pat. No. 5,204,594, issued Apr. 20, 1993, assigned to SGS-Thomson Microelectronics, Inc., and incorporated herein by this reference.

However, it has been observed that the use of a sensing resistor is disadvantageous due to its necessary power dissipation (i.e., the square of the load current times the resistance value), and also because the available voltage drop across the driven coils is reduced from that which is otherwise available, thus reducing the maximum available drive to the coils.

By way of further background, copending application Ser. No. 07/890,945, filed May 29, 1992, entitled "Circuit for Providing Drive Current to a Motor Using a SenseFET Current Sensing Device and a Fast Amplifier", assigned to SGS-Thomson Microelectronics, Inc. and incorporated herein by this reference, describes another approach for sensing the drive current applied to motor coils. According to this technique, a so-called "sensefet" is the high side driver which drives the coil from a source output and which also provides a current sensing output; the sensing output and the source output of the sensefet are applied to differential inputs of an amplifier to provide a feedback signal to the motor control system.

Another conventional technique utilizes current mirror sensing to measure the load current. In this approach, mirror transistors are connected substantially in parallel with drive transistors in the motor control circuit, so that the current through the drive transistor is mirrored in the mirror transistor. Usually, the mirror transistor is significantly smaller (in width/length ratio) than its associated drive transistor, so that the current therethrough is a fraction of that through the drive transistor.

According to one implementation of the current mirror sensing scheme, a resistor is in series with the source/drain path of the mirror transistor, so that the voltage across the resistor is proportional to the current through the mirror transistor, and thus proportional to the current through the corresponding drive transistor. According to another technique, described in U.S. Pat. No. 4,827,207, issued May 2, 1989, and incorporated herein by this reference, a voltage regulator circuit is used to equalize the drain voltage of the primary and mirror transistors to one another; in this approach, the sensing resistor is included within the feedback loop of the voltage regulator.

When applied to a polyphase brushless DC motor, the conventional current mirror sensing approach individually senses current driven through each of the push-pull legs of the driver circuit. FIG. 2 illustrates such an arrangement, where rotor coils 2, 3, 4 are driven by power transistor pairs 14/15, 14'/15', and 14"/15" as before. In each driver leg, a mirror transistor 16 is provided that has its gate and source biased in common with the gate and source of an associated low side drive transistor 15. Resistive load 17 is provided in series with the source-drain path of mirror transistor 16, across which a voltage reading may be made. As noted above, it is conventional to have the width/length ratio of mirror transistor 16 be much smaller than that of its associated low side driver transistors 15, so that the current conducted through mirror transistor 16 is proportional but much smaller than that conducted by its low side driver transistor 15, to minimize power dissipation in the sensing leg. As is evident in FIG. 2, each leg of the driver circuit includes such a current mirror sensing arrangement.

In an arrangement such as FIG. 2, it is important to obtain information regarding the load current (as sensed by mirror transistor 16 and sensing load 17) at all times during the commutation cycle, including during commutation switching. As such, the mirror leg must accurately measure the varying current levels that are produced during the various phases and times within a phase. It has been observed, however, that measurement inaccuracies result from mirror sensing such as that illustrated in FIG. 2, considering that the transients introduced by commutation between phases upset the accuracy of the mirror leg.

By way of further background, it is well known in the art that it may be useful to operate a brushless DC motor in bipolar mode (i.e., with two coils driven in each phase) during startup of a motor, and then to switch to unipolar mode (i.e., only one coil driven in each phase) once a desired operating speed is reached. This operation is beneficial since the unipolar operation reduces the effects of back emf induction in the driven coils at higher rotational speeds. As is known in the art, back emf in a driven coil reduces the available driving voltage that can be applied to the coil, which reduces the drive current to the coil and thus limits the torque of the motor.

It is therefore an object of the present invention to provide an improved circuit and method for sensing load current in the driving of a brushless DC motor.

It is a further object of the invention to provide such a circuit and method that is less susceptible to commutation transients.

It is a further object of the invention to provide such a circuit and method that is may be applied to a motor driver that utilizes both bipolar and unipolar commutation modes.

Other objects and advantages of the present invention will be apparent to those of ordinary skill in the art having reference to the following specification together with the drawings.

SUMMARY OF THE INVENTION

The present invention may be incorporated into a control circuit for a brushless polyphase DC motor, in which the drive current is to be sensed and used for control of the motor, and in which the control circuit is operable in a unipolar mode, where a single motor coil is driven by a voltage applied across it and the center tap of the coil arrangement. The present invention provides a current mirror transistor in parallel with the drive transistor for the center tap. The center tap current mirror transistor continuously senses the drive current for all phases of the unipolar drive mode, avoiding ripple effects induced during commutation by nonlinearities in the sensing elements for the driven coils.

According to another aspect of the present invention, current mirror transistors are also provided for both the high side and low side drivers for each coil, selectably operable during bipolar mode. The currents sensed by these current mirror transistors are summed at a sense node. Since only one driver changes at a time in bipolar mode, the summed sensed current will never drop to zero during commutation, thus reducing ripple in the overall sensed current.

DETAILED DESCRIPTION OF THE PREFERRED EMBODIMENT

Figure 3:
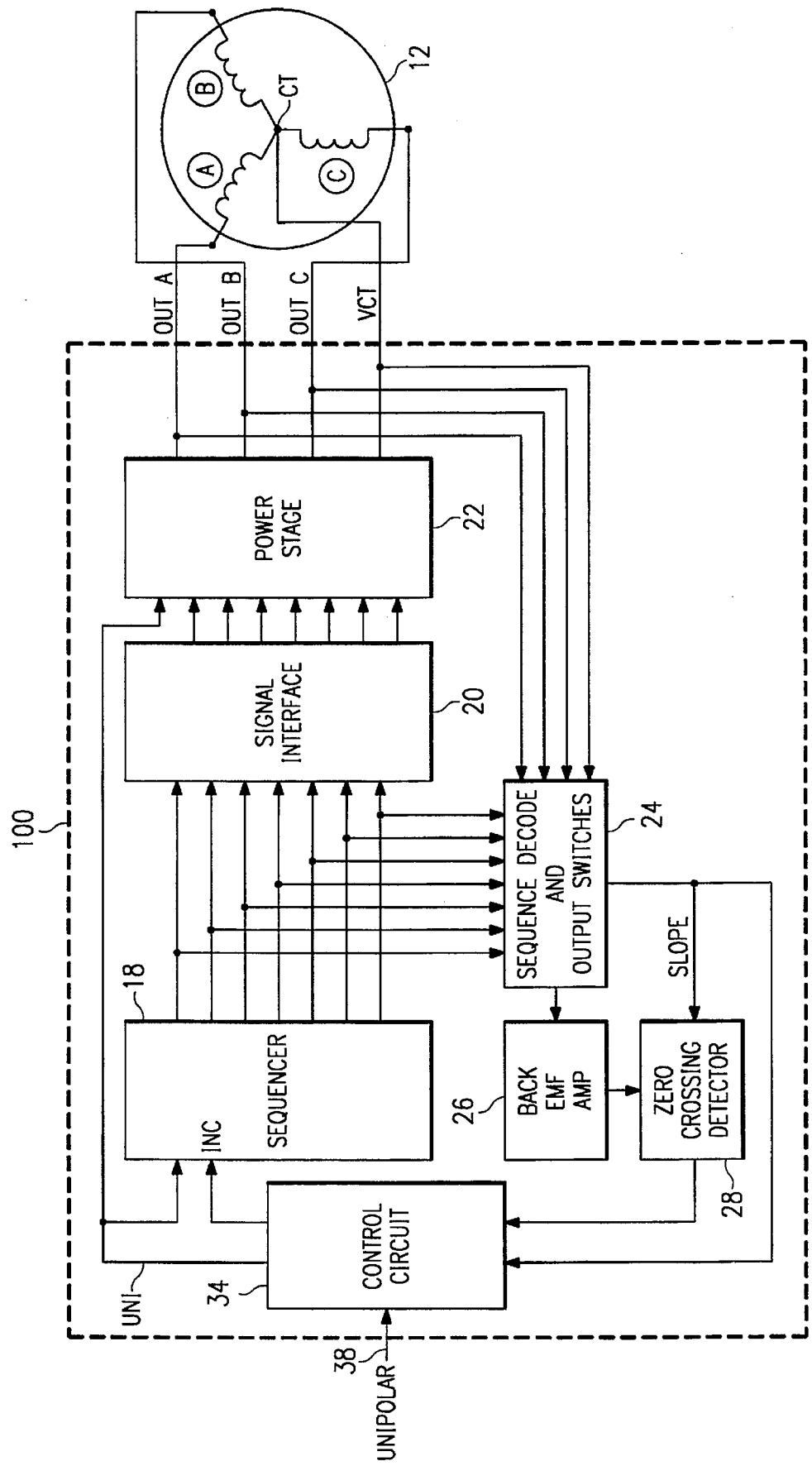
FIG. 3 is an electrical diagram, in block form, of a motor controller and a motor into which the present invention may be incorporated.

FIG. 3 illustrates a simplified electrical schematic block diagram of a motor controller 100 and a motor 12 incorporating the present invention. The diagram of FIG. 3 is simplified to demonstrate underlying principles of motor operation and control, with it understood that one skilled in the art could make various additions or substitutions while still benefitting from the present invention. Additional description of the structure and operation of polyphase DC motors is provided in U.S. Pat. No. 5,306,988, entitled "Method And Apparatus For Operating Polyphase DC Motors," issued Apr. 26, 1994, assigned to SGS-Thomson Microelectronics, Inc., and incorporated herein by reference. Motor controller 100 is preferably integrated onto a single microcontroller chip, but could also be constructed using discrete components. For purposes of discussing operation, motor 12 is illustrated as only including three stator coils A, B, and C; however, it is understood that various other mechanical and electrical components, such as the motor rotor, will also be included in the system of FIG. 3, in the well-known manner.

In general, the three coils of motor 12 are connected in a "Y" configuration, and each coil receives an energizing voltage (i.e., OUTA, OUTB, and OUTC, respectively) from output terminals of controller 100. As stated above, the motor of the present invention operates in at least two modes, namely, a bipolar mode and a unipolar mode. Thus, the particular energizing or deactivation of a coil or coils depends on the mode of operation, as well as the sequential operation within a given mode. Further, the center of the "Y" configuration, known as the motor center tap ("CT"), is coupled to controller 100 so controller 100 may measure the CT potential during bipolar mode, and provide a biasing signal during unipolar mode. Although not shown, other feedback lines, in addition to those measuring center tap voltage, communicate certain motor parameters back to controller 100. While the preferred embodiment of the invention is described with regard to a three phase motor, the principles of the invention can be advantageously applied to polyphase motors in general, and to motors in which the center tap connection is simulated.

Controller 100 includes various components, only some of which are shown in FIG. 3 for purposes of simplicity, illustrated in block fashion to represent the basic functionality of controller 100. Numerous alternative or additional components may be included, such as shown in the above-incorporated patents and patent applications. As shown, controller 100 includes a control circuit 34' which receives various inputs, including feedback data in response to ongoing motor operation, to control the overall operation of controller 100 and, thus, motor 12. For reasons detailed below, control circuit 34 includes a unipolar input 38 for receiving a signal indicating a request for the mode of operation of motor 12 to change from bipolar mode to unipolar mode. While unipolar input 38 of FIG. 3 connotes receipt of an external request signal, the present invention also may be incorporated into a circuit wherein the unipolar mode request is internally generated.

Control circuit 34 is coupled to a bipolar/unipolar sequencer 18. Sequencer 18 outputs control signals so that the coils of motor 12 are selectively energized through a given sequence, either in bipolar or unipolar mode. In this example, control circuit 34 increments sequencer 18 by way of a signal on line INC so that it moves from one sequence to the next sequence, and so forth, each time changing the energy configuration applied to the motor coils and thus changing the field imposed on the motor rotor. Particularly, sequencer 18 outputs a set of control signals to signal interface 20 for each sequence. Signal interface 20 passes these signals (absent some other command or reason to inhibit the passage of signals) to a power stage 22. Power stage 22 includes power components, such as power MOSFETs, to drive the various coils and center tap of motor 12. Accordingly, for a given stage in the sequence, the appropriate combination of power (via OUTA, OUTB, OUTC, and in unipolar mode, also VCT) is passed to motor 12, with the combination changing for each stage in the sequence, thereby advancing the motor rotor.

Control circuit 34 also presents a unipolar request signal on line UNI to sequencer 18 and to power stage 22, to enable the operation of motor 12 in unipolar mode upon the motor reaching a certain operating speed. The switching from bipolar mode to unipolar mode reduces the back emf and its current limiting effect in the stator by having the number of flux linkages or coil turns in the current path.

A feedback path is formed within controller 100 so that current motor operation may be used to control continuing motor operation. Thus, output terminals OUTA, OUTB, OUTC, and VCT are returned to a block of sequence decode and output switches 24. Switches 24 selectively couple these signals to a back emf amplifier 26 for evaluating the back emf of both the floating and non-floating coils of motor 12. Zero crossing detector 28 determines the zero crossing point by comparing the back emf to the center tap voltage (i.e., VCT) and, concluding the point is reached when the two voltages are equal. This zero crossing point determination is coupled to control circuit 34. Sequence decode and output switches 24 also determine the slope of the back emf for the floating coil during each particular sequence, that is, negative-to-positive-going or positive-to-negative-going. As known in the art, such an indication is used to ensure accuracy of motor operation. For example, the slope indication prevents zero crossing detector 28 from wrongfully responding to a sudden voltage spike as opposed to a true zero crossing event, and is also Used in accurately determining motor position. This slope information is also coupled to control circuit 34.

Figure 4A:
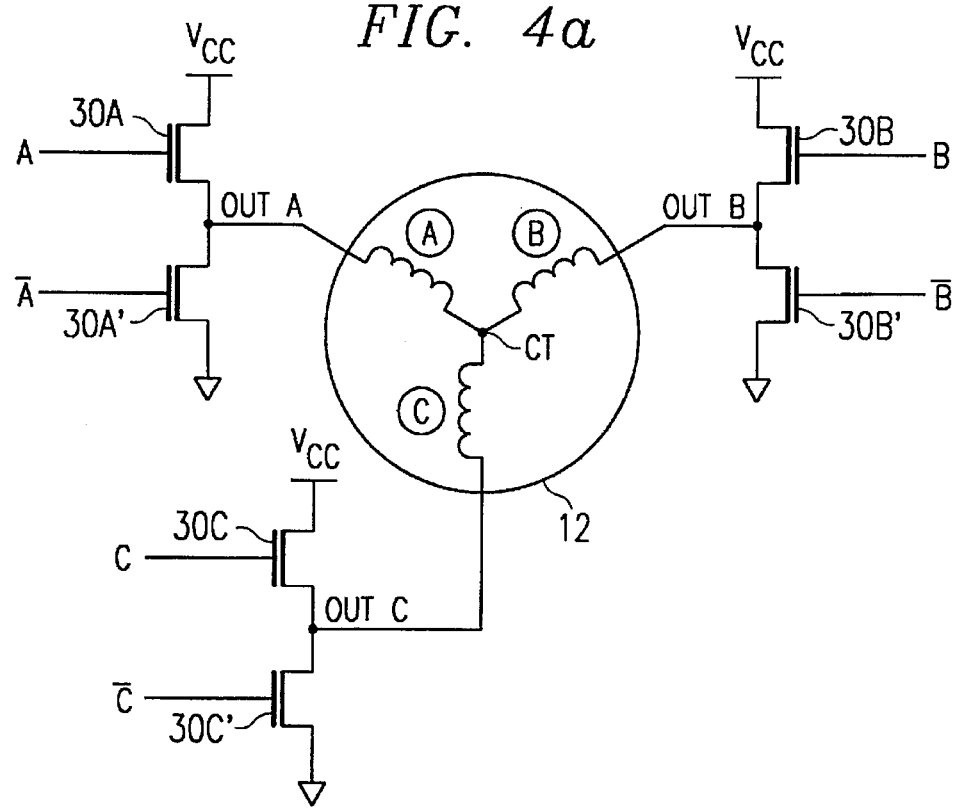
FIG. 4a is an electrical diagram, in schematic form, of a motor and a simplified schematic of the power circuitry driving each of the coils of the motor in the bipolar mode.

FIG. 4a illustrates motor 12 and a simplified schematic of the power circuitry driving each of the coils of motor 12 in the bipolar mode. Each of stator coils A, B, and C is driven by a pair of MOSFETs. Particularly, stator coil A is coupled between a pair of FETs 30A and 30A', coil B is coupled between a pair of FETs 30B and 30B' and stator coil C is coupled between a pair of FETs 30C and 30C'.

Each FET pair is coupled to source and sink current in the same general fashion. For example, high side drive transistor 30A is coupled to a source voltage (e.g., $V_{CC}$) while low side drive transistor 30A' is coupled to a lower voltage (e.g., ground). While ground is shown as the low side potential, as will be described hereinbelow, additional circuitry is preferably coupled between $V_{CC}$ and transistor 30A' to establish the low side potential, so as to limit the current flow without completely grounding transistor 30A'. Control electrodes of the drive transistors, such as the gates of each transistor 30A, 30A', receive drive signals A and $\overline{A}$ from sequencer 18.

In the bipolar mode, the motor coils are selectively energized such that each current path in the sequence includes two of the three stator coils, while the third coil floats. According to this description, the term "float" corresponds to placing the drive transistors of a coil in a tristate condition. Table 1 below shows the current path in each of the six bipolar mode commutation phases, in sequence.

TABLE 1

| Phase | Current Flows From Coil | To Coil | Floating Coil |
| --- | --- | --- | --- |
| 1 | A | B | C |
| 2 | A | C | B |
| 3 | B | C | A |
| 4 | B | A | C |
| 5 | C | A | B |
| 6 | C | B | A |

Figure 4B:
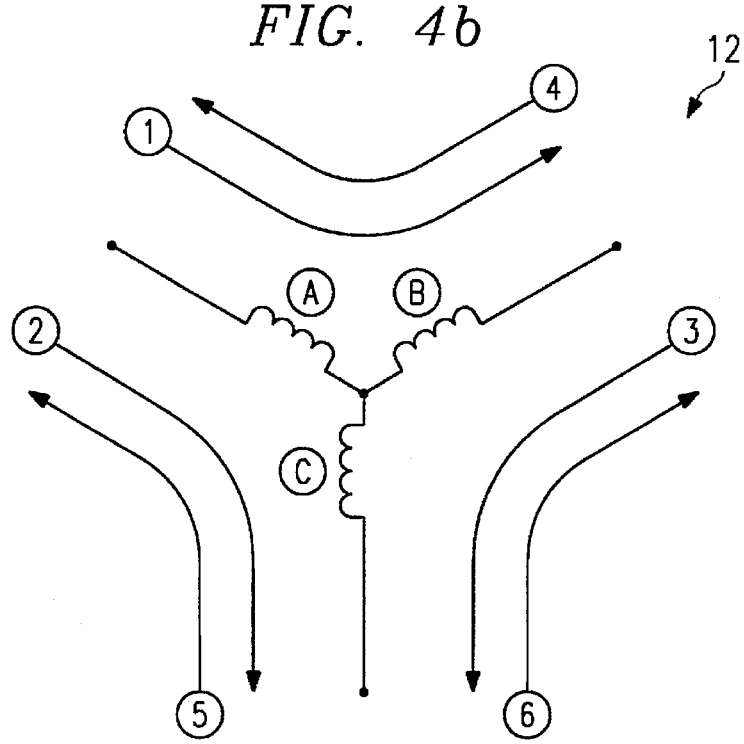
FIG. 4b is a schematic diagram illustrating the current path for the six phases of the bipolar mode.

FIG. 4b illustrates the stator coils of motor 12 and the current path for the six phases of Table 1, with each current path labeled by its respective phase. Thus, FIG. 4b demonstrates that when a floating coil is switched into the current path, current flows through it in the same direction in which it flowed through the coil which was in the path in the immediately preceding phase.

Returning to FIG. 4a, the operation of the transistor pairs to achieve the sequence of Table 1 is now discussed. In phase 1, current flows from coil A to coil B; thus, transistors 30A and 30B' are on, while transistors 30A' and 30B are off. Consequently, in accordance with the nomenclature defined above, the high side is on for coil A and the low side is on for coil B. In phase 2, again current flows from coil A, but to coil C instead of coil B. Thus, transistors 30A and 30A' remain on and off, respectively, but transistor 30B' is now turned off to discontinue current flow to coil B, and transistor 30C' is turned on to establish the current path through coil C. In other words, the low side of coil C conducts in place of the low side of coil B. This switching operation is generally known as a low side to low side commutation, because the commutation is performed by turning off one low side transistor (e.g., 30B') while turning on another low side transistor (e.g., 30C').

In phase 3, current continues to flow through coil C, but is sourced from coil B instead of coil A, with the high side of coil B conducting instead of the high side of coil A (as was the case in phase 2). This switching operation is generally known as a high side to high side commutation. In phase 4, current continues to source through coil B, but flows to coil A instead of coil C. The commutation from phase 3 to phase 4 switches the low side drive of coil B on and the low side of coil C off, in a low side to low side commutation. The above process continues through all phases of the bipolar sequence of Table 1.

Figure 5:
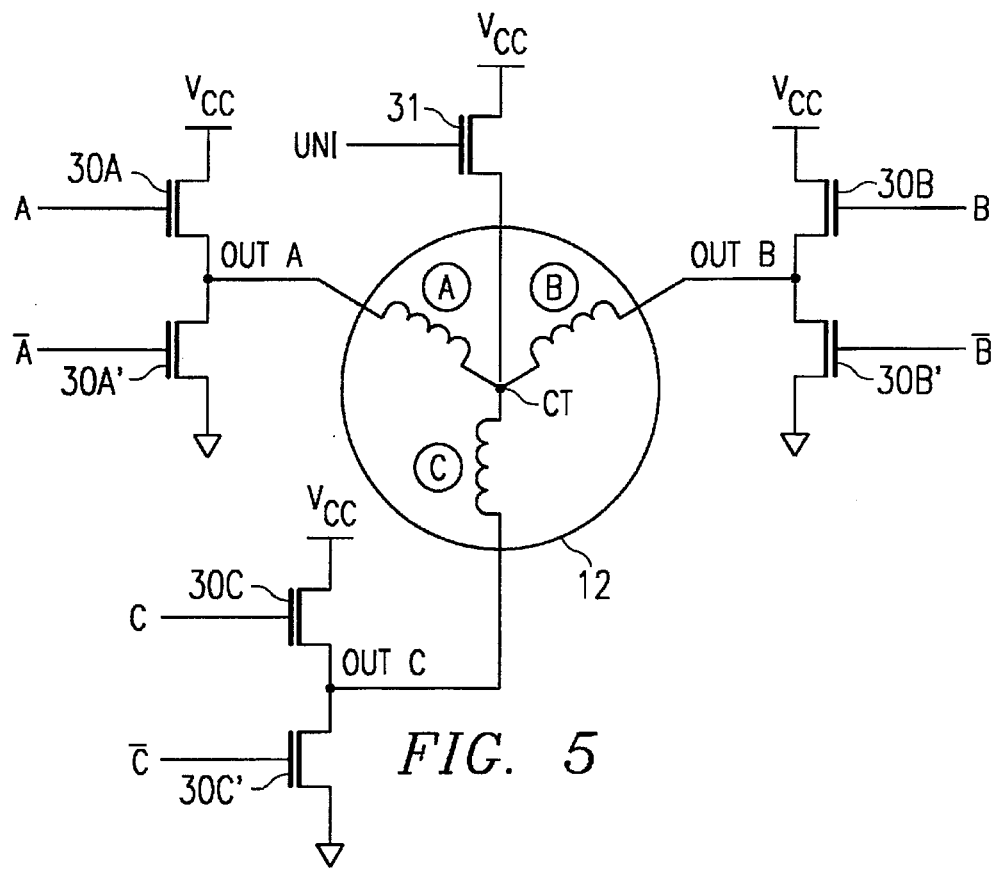
FIG. 5 is an electrical diagram, in schematic form, of a motor and a simplified schematic of the power circuitry driving each of the coils of the motor in the unipolar mode.

In contrast, during unipolar operation, a single coil of coils A, B, and C is energized at a time. As shown in FIG. 5, a center tap FET 31 is coupled to the center tap node of motor 12 to accomplish the unipolar mode, and is operable to couple the center tap to the voltage source $V_{CC}$. Thus, in unipolar mode, a single coil is energized in each phase by turning on its low side drive transistor and center tap FET 31, so that current flows from $V_{CC}$ through center tap FET 31, through the energized coil, and through the low side drive FET to the low side potential. Alternatively, the opposite polarity of drive current may be effected by connecting center tap FET 31 between center tap CT and ground, in which case the high side drive transistors would regulate the drive current.

To switch from bipolar to unipolar mode, controller 34 responds to the request signal at input 38 (FIG. 3) by generating a signal UNI to sequencer 18, so that the proper commutation signals are produced. It has been determined that switching to unipolar mode at certain times may adversely effect the operation of the motor. For example, when the switch from bipolar mode to unipolar mode occurs near a zero-crossing point, a change in the back emf across the stator coils has been observed, which results in movement in the zero-crossing point, which may disturb the motor sequencing and which may also cause a large modulation in motor torque.

In this embodiment of the invention, the switching from bipolar mode to unipolar mode is made at a point in time away from a zero crossing, to reduce the undesirable results of changing modes near the zero crossing. Since, in this example, zero crossings occur every 60 degrees, it is preferred to switch from bipolar mode to unipolar mode near the midpoint between successive zero crossings, for example at approximately 30 degrees following a zero crossing (which will be 30 degrees before the next expected zero crossing). This switch timing minimizes the effects that a mode change would present if it occurred near a zero crossing point.

Figure 6:
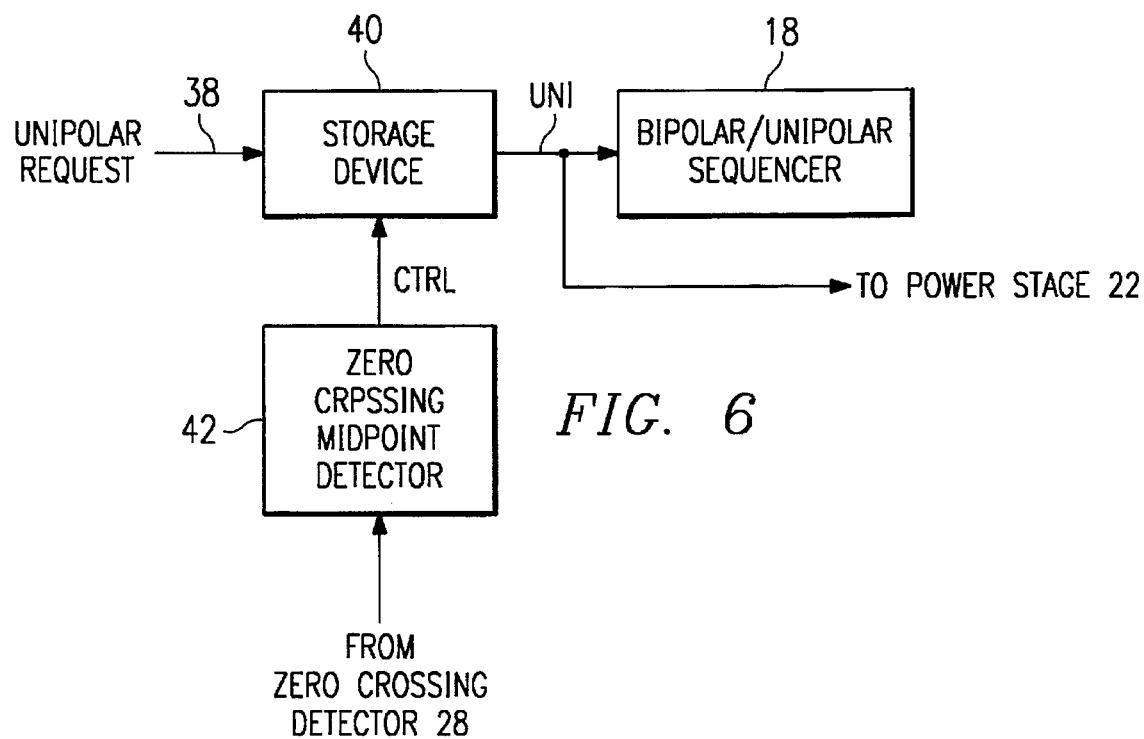
FIG. 6 is an electrical diagram, in block form, of the components for controlling the timing of switching between bipolar mode and unipolar mode in the system of FIG. 3.

FIG. 6 illustrates a block diagram of the preferred components for controlling the timing of switching between bipolar mode and unipolar mode in this manner. As noted above, request input 38 receives a unipolar request signal, which is an internally or externally generated signal to initiate switching from bipolar mode to unipolar mode. Request input 38 is coupled to the data input of a storage device 40, which preferably is a conventional latch. The control input of storage device 40 is coupled to the output of zero crossing midpoint detector 42, and the output of storage device 40 is coupled to bipolar/unipolar sequencer 18. Zero crossing midpoint detector 42 receives zero crossing detection signals from zero crossing detector 28 of FIG. 3, and determines the midpoint in time therebetween; for example, zero crossing midpoint detector 42 may be a simple delay circuit to delay the signal by 30°, or of course may be a complex circuit to more intelligently estimate the midpoint. The components of FIG. 6 are preferably incorporated into controller 100 of FIG. 3, such as by implementing storage device 40 and zero crossing midpoint detector 42 within control circuit 34.

The operation of the arrangement of FIG. 6 begins initially, with sequencer 18 presenting the appropriate signals to power stage 22, via interface 20, so that motor 12 commutates in the bipolar mode of operation. At some point, such as when torque or motor speed reaches a certain level, a request to switch to unipolar mode is presented at input 38. Storage device 40 stores this request, but does not yet issue it to sequencer 18. Instead, storage device 40 awaits a signal from zero crossing midpoint detector 42. Zero crossing midpoint detector 42 issues a signal at approximately the midpoint between zero crossings as detected by zero crossing detector 28, for example at a point 30° in phase after the most recent zero crossing. Upon receiving this signal from zero crossing midpoint detector 42, storage device 40 outputs the stored unipolar request to sequencer 18 on line UNI at substantially the midpoint in time between zero crossings, at which time sequencer 18 switches from bipolar mode to unipolar mode. The request on line UNI is also forwarded to power stage 22 to effect the current sensing arrangement, as will be described in detail hereinbelow.

Of course, switching from bipolar mode to unipolar mode may be made according to any other suitable technique, including those conventionally used in the art for such control.

Figure 7:
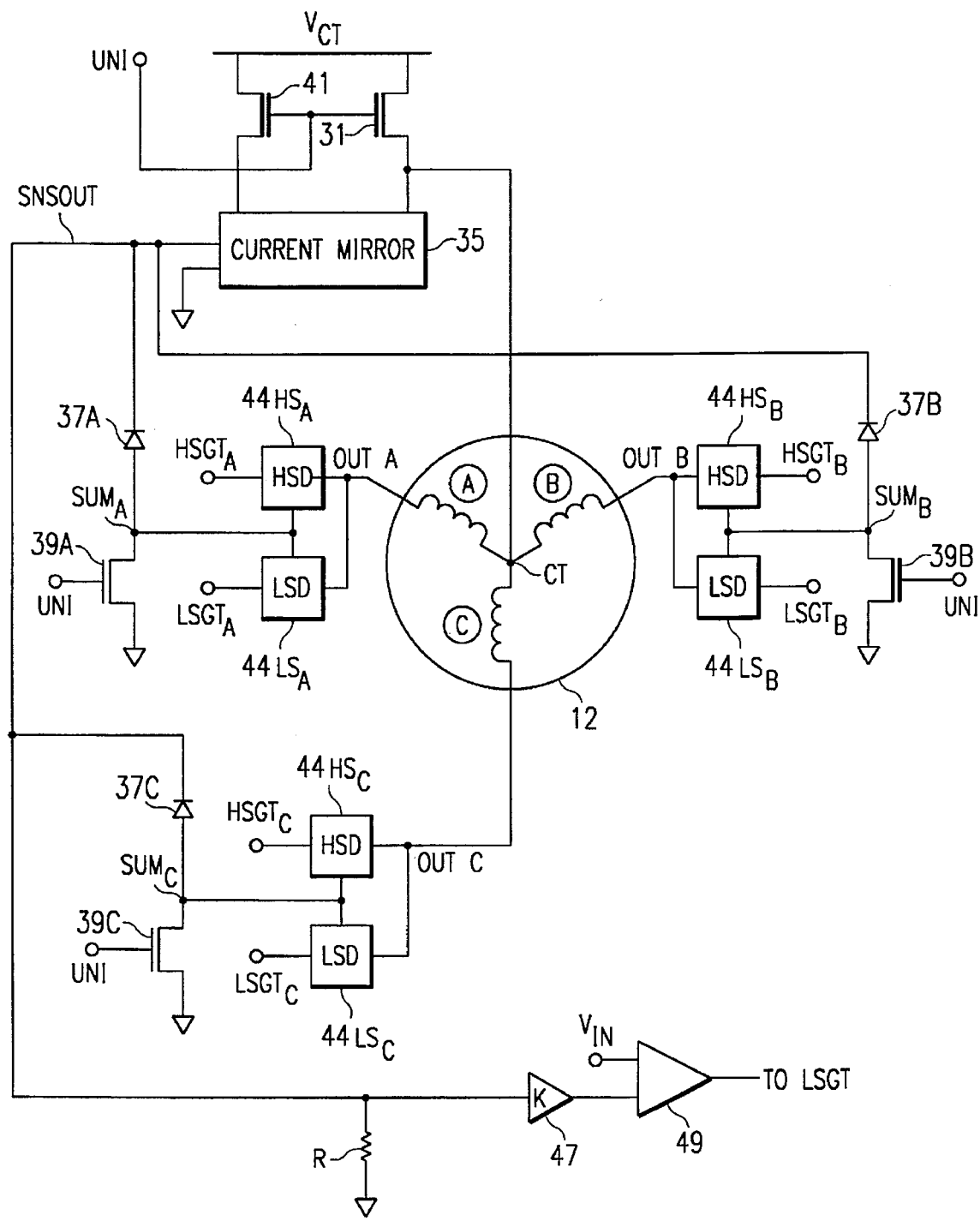
FIG. 7 is an electrical diagram, in schematic form, of circuitry included in the power stage of the system of FIG. 3, according to the preferred embodiment of the invention.

Referring now to FIG. 7, a portion of power stage 22 according to the present invention will now be described in detail, particularly relative to the current sensing arrangement therein. In this description, all field-effect transistors shown in FIG. 7, and in the remainder of the Figures corresponding to this specification, are of the n-channel type unless otherwise specified. Stator coils A, B, C of motor 12 are connected together in the "Y" configuration, as above, between center tap CT and their respective drive nodes OUTA, OUTB, OUTC. With reference to coil A, for example, node OUTA is driven by high side driver $44HS_A$ and by low side driver $44LS_A$, each of which will be described in further detail hereinbelow. High side driver $44HS_A$ is controlled by a signal on line $HSGT_A$, and low side driver $44LS_A$ is controlled by a signal on line $LSGT_A$, in the manner described hereinbelow. Coils B and C are similarly driven.

Figure 1:
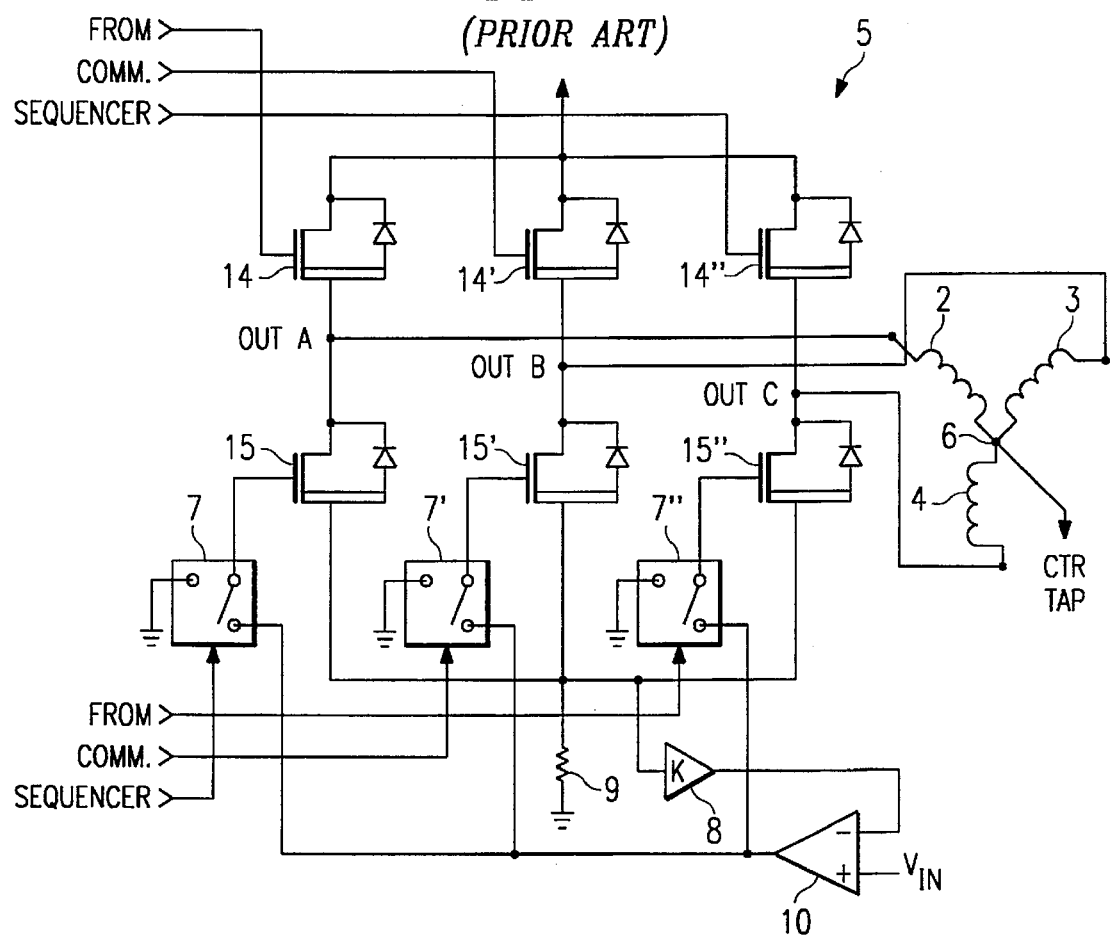
FIG. 1 is an electrical diagram, in schematic form, of a driver control circuit and motor coils according to the prior art, including a single current sense resistor.
Figure 2:
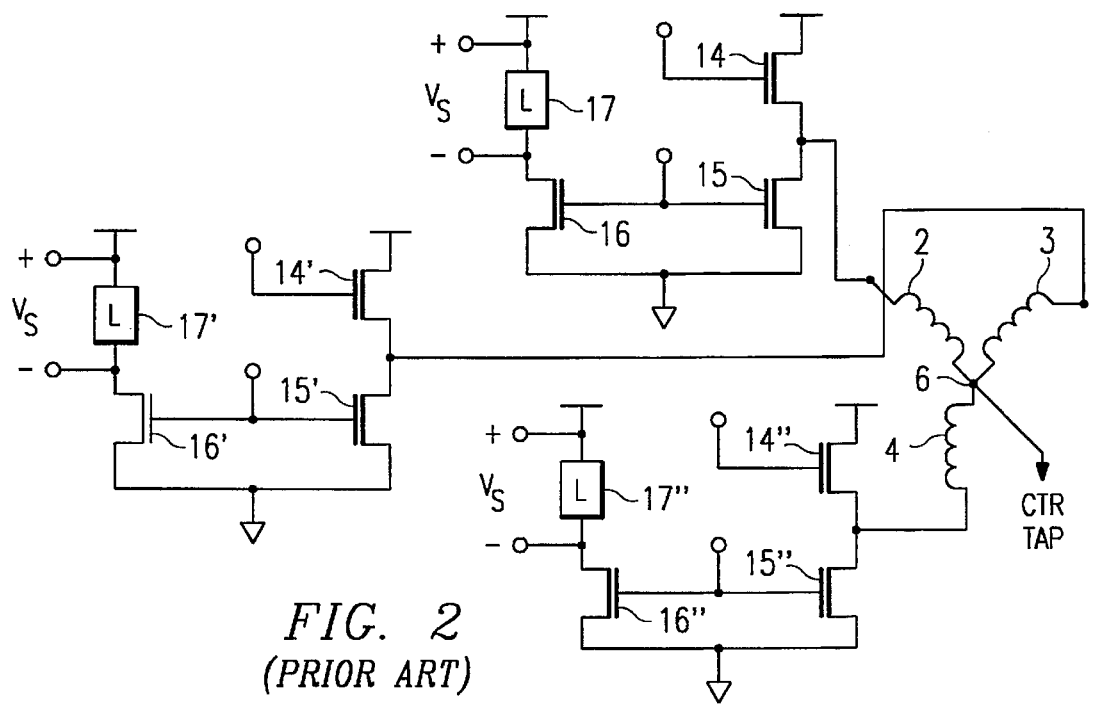
FIG. 2 is an electrical diagram, in schematic form, of a driver control circuit and motor coils according to the prior art, including a current mirror for each low-side driver transistor.

As in FIG. 1 described hereinabove, in bipolar mode according to this embodiment of the invention, high side driver gate signals $HSGT_A$, $HSGT_B$, $HSGT_C$ are driven to be fully on during the appropriate commutation phases; in both bipolar and unipolar mode, low side driver gate signals $LSGT_A$, $LSGT_B$, $LSGT_C$ are controlled according to the load current being driven. According to this embodiment of the invention, and as will be described in detail hereinbelow, each of high side drivers 44HS and low side drivers 44LS include a current mirror for sensing the load current; the sensed currents are summed at node $SUM_A$, $SUM_B$, $SUM_C$ for coils A, B, C, respectively. Each sum node SUM is connected by way of a diode 37 to node SNSOUT, i.e. sense output node, at which the sum of all sensed currents appears. Node SNSOUT is connected to a resistor R across which a voltage is generated, and to constant gain amplifier 47, the output of which is connected to amplifier 49. The output of amplifier 49 is applied to the one of the low side driver gate signals $LSGT_A$, $LSGT_B$, $LSGT_C$ that is turned on in a particular commutation phase, as described hereinabove.

For operation in unipolar mode, center tap drive transistor 31 is connected between a voltage $V_{ct}$ and center tap CT. The gate of center tap drive transistor 31 is controlled by unipolar signal UNI (or a signal derived therefrom, as will be shown hereinbelow) generated by control circuit 34 of FIG. 3. According to this embodiment of the invention, in unipolar mode, load current is sensed by current mirror transistor 41 that is connected in parallel with center tap drive transistor 31, with its drain likewise connected to voltage $V_{ct}$ and its gate controlled by unipolar signal UNI (or a signal derived therefrom). Each of center tap drive transistor 31 and mirror transistor 41 are connected to current mirror 35, the construction of which will be described in detail hereinbelow. The output of current mirror 35 is connected to node SNSOUT, for communication of the load current through center tap drive transistor 31, as sensed by mirror transistor 41 and amplified by current mirror 35, to constant gain amplifier 47 and amplifier 49.

Also according to this embodiment of the invention, in unipolar mode, only the center tap load current is used in controlling low side drivers 44LS. Accordingly, each of coil sum nodes SUM$_A$, SUM$_B$, SUM$_C$ are connected to the drain of a disable transistor 39 that has its source connected to ground and its gate controlled by unipolar signal UNI. As such, in bipolar mode, with unipolar signal UNI low, transistors 39 are all turned off, and the currents sensed by high side and low side drivers 44HS, 44LS, respectively, are applied in the aggregate to amplifiers 47, 49; meanwhile, center tap drive transistor 31 and its current mirror transistor 41 are turned off in bipolar mode. Conversely, in unipolar mode (line UNI high), each of n-channel transistors 39 is turned on, so that the SUM nodes are all pulled to a reference voltage, such as ground, reverse biasing each of diodes 37 and eliminating current sensed by high side and low side drivers 44HS, 44LS, respectively, from being applied to amplifiers 47, 49. With unipolar signal UNI high, center tap drive transistor 31 and its current mirror transistor 41 are enabled, in which case the current provided at node SNSOUT corresponds to the load current through center tap CT.

The current sensing provided by current mirror transistor 41, in parallel with center tap drive transistor 31, provides significant advantages in the operation of a motor drive system with load current feedback. These advantages include those of current mirror sensing relative to the use of a sense resistor, such as elimination of a voltage drop in the drive of motor coils and also reduced power dissipation (which is especially important for low power applications such as disk drive motors in portable computers). Center tap load current sensing according to the present invention provides the additional advantages, in unipolar mode, of continuous current sensing during and over all phases of the commutation sequence, by a transistor that is not commutated during the sequence. According to the present invention, however, since current is sensed by mirroring the current through a center tap drive transistor that is not commutated in unipolar mode, ripple effects in the sensed current are eliminated.

Figure 8:
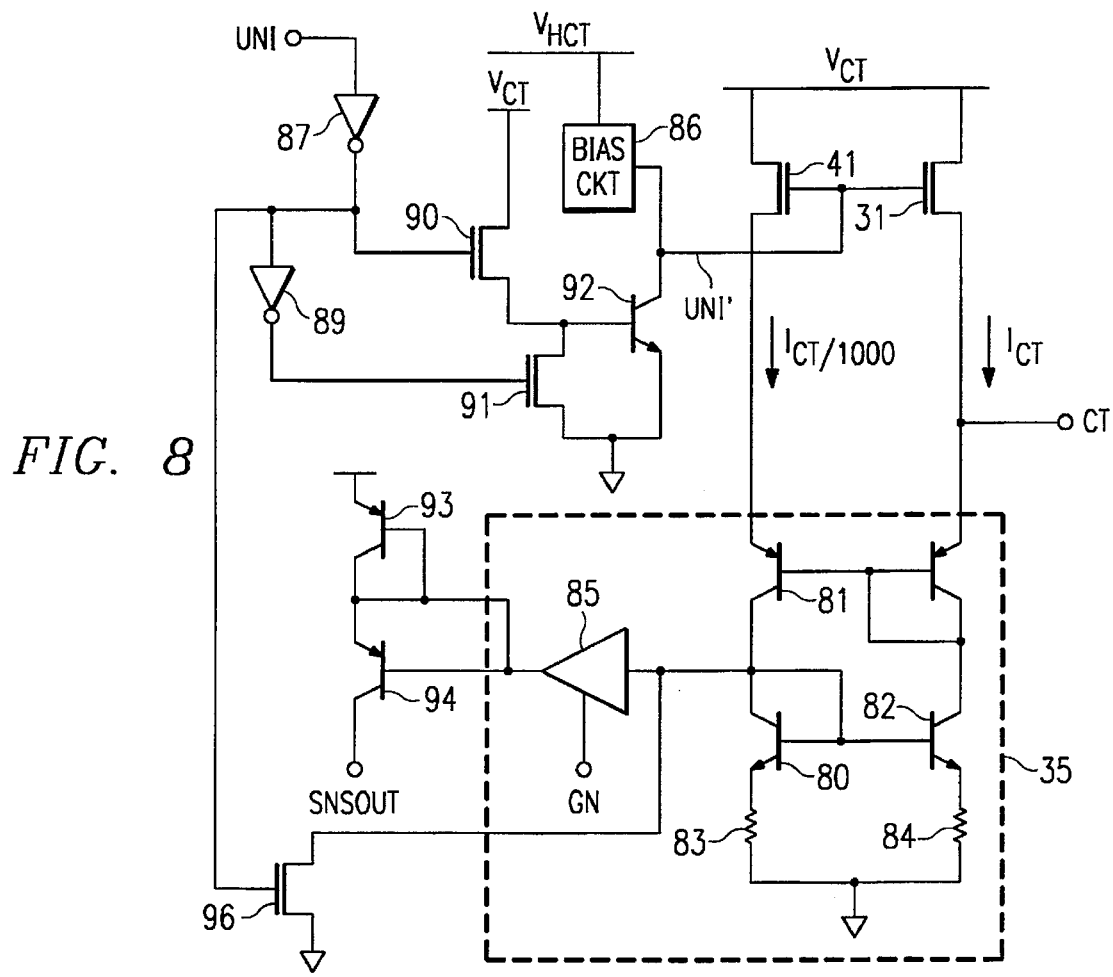
FIG. 8 is an electrical diagram, in schematic form, of circuitry of FIG. 7 directed to the sensing of load current from the center tap in unipolar mode, according to the preferred embodiment of the invention.

Referring now to FIG. 8, the construction and operation of current mirror 35, together with center tap drive transistor 31 and its mirror transistor 41, will now be described in detail. As noted above relative to FIG. 7, center tap drive transistor 31 has its source connected to center tap CT and its drain biased to voltage $V_{ct}$; similarly, mirror transistor 41 has its drain biased to voltage $V_{ct}$ and its gate connected in common to the gate of transistor 31. The gates of transistors 31, 41 are controlled, as shown in FIG. 8, by unipolar signal UNI', which is a derivative of unipolar request signal UNI generated by control circuit 34. Mirror transistor 41 is preferably of a size (i.e., width/length ratio) that is much smaller than that of center tap drive transistor 31, so that power dissipation is minimized; in this example, the size of center tap drive transistor 31 is one thousand times that of mirror transistor 41. In the current mirror configuration of FIG. 8, center tap drive transistor 31 will conduct load current $I_{ct}$ that is one thousand times the current conducted by mirror transistor 41.

Derivative unipolar signal UNI' is produced responsive to unipolar request signal UNI from control circuit 34. Signal UNI is inverted once by inverter 87 and a second time by inverter 89 (which is connected to the output of inverter 87). The output of inverter 87 is connected to the gate of transistor 90, which has its drain biased to $V_{ct}$ and is also connected to the gate of transistor 96; the output of inverter 89 is connected to the gate of transistor 91, which has its drain connected to the source of transistor 90 and its source connected to ground. Bipolar transistor 92 has its base connected to the source of transistor 90 and the drain of transistor 91 and has its emitter connected to ground. The collector of transistor 92 drives derivative unipolar signal UNI' that is applied to the gates of transistors 31, 41. Bias circuit 86 consists of the appropriate number of voltage drops and other elements to present the appropriate voltage to line UNI', so that in unipolar mode the gates of transistors 31, 41 are properly biased; it is contemplated that one of ordinary skill in the art will be able to properly bias transistor 92 (when on) as desired for the particular application. Since transistor 31 is n-channel, it may be useful to drive its gate to a voltage above $V_{ct}$ to allow center tap CT to be driven fully to $V_{ct}$; as such, bias circuit 86 receives a higher voltage $V_{hct}$ so that the voltage on line UNI' may be above $V_{ct}$, as desired.

In bipolar mode, line UNI is at a low logic level. Inverter 87 thus turns on transistor 90 and inverter 89 turns off transistor 91. The base of transistor 92 is thus pulled high by transistor 90, driving node UNI' to ground and in turn turning off transistors 31, 41. In addition, a low logic level on line UNI turns on transistor 96 via inverter 87, forcing the input of buffer 85 to ground. Conversely, unipolar mode is effected by line UNI being at a high logic level. This turns off transistor 90 (via inverter 87) and turns on transistor 91 (via inverters 87 and 89), in turn turning off transistor 92; transistor 96 is also turned off (via inverter 87), to allow buffer 85 to respond to the output of the current mirror. This allows bias circuit 86 to set the voltage at line UNI' and at the gates of transistors 31, 41, for unipolar operation. The operation of transistor 92 responsive to unipolar request signal UNI is also quite fast, so that switching between modes can be effected quickly.

Current sensing is provided by current mirror 35, including buffer 85 therein, and is presented to node SNSOUT via transistors 93, 94. The source of center tap drive transistor 31 is connected to center tap CT and to the primary side of bias network 81; the source of mirror transistor 41 is connected to the mirror side of bias network 81. Bias network 81, as is known in the current mirror art, provides the proper bias to transistors 31, 41, and to the remainder of current mirror 35, according to the desired operating point; in this example, bias network 81 is implemented as p-n-p transistors in each of the primary and mirror legs of current mirror 35, having their bases connected together and to the collector of the transistor in the primary leg (i.e., the leg connected to the source of transistor 31). The primary side of bias network 81 is connected to the collector of n-p-n transistor 82, with the emitter of transistor 82 is connected to ground through resistor 84. Similarly, the mirror side of bias network 81 is connected to the collector of n-p-n transistor 80, which has its emitter connected to ground through resistor 83. The bases of transistors 80, 82 are connected together and to the collector of transistor 80, and provide the output of the current mirror stage.

Figure 9:
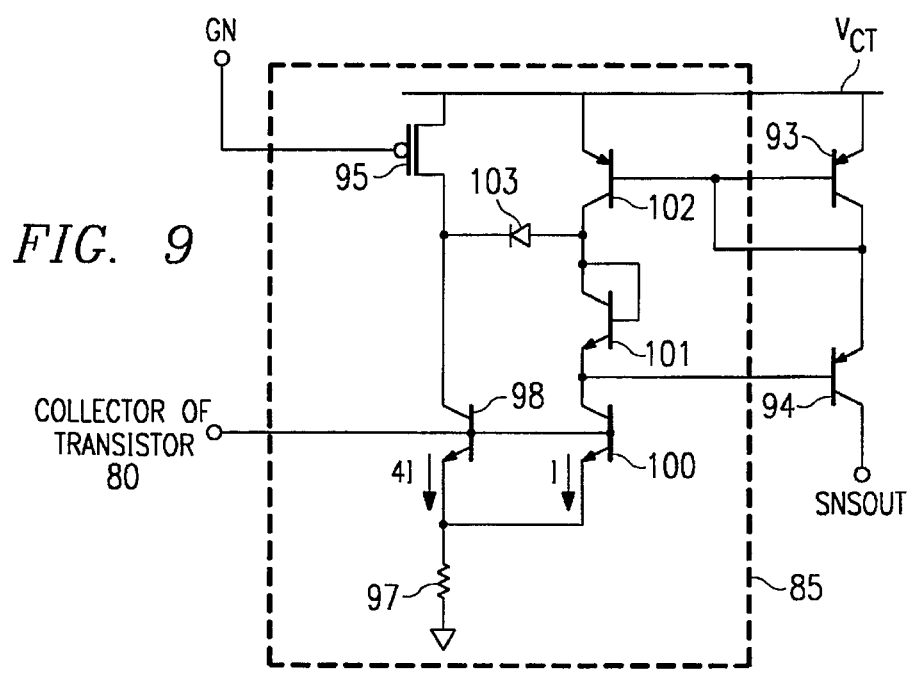
FIG. 9 is an electrical diagram, in schematic form, of the selectable gain current mirror buffer in the circuitry of FIG. 8.

The output of the first current mirror stage, at the collector of transistor 80, is received at an input of variable gain current mirror buffer 85, which also receives a control input on line GN. Buffer 85 buffers the output current from the sensing current mirror (transistors 41 et al.); in this embodiment of the invention, the gain of buffer 85 is selectable according to the signal on line GN. The input of buffer 85 is also connected to the drain of transistor 96, which has its gate driven by the line UNI (via inverter) 87 and which has its source biased to ground. FIG. 9 illustrates the construction of variable gain buffer 85. As shown in FIG. 9, buffer 85 contains another current mirror of n-p-n transistors 98, 100, each of which receive the collector of transistor 80 at its base, and each of which have their emitters connected to ground through common resistor 97. The collector of transistor 100 is connected, via bias transistor 101, to the collector of p-n-p transistor 102, the emitter of which is connected to center tap voltage $V_{ct}$. The second leg of buffer 85 is completed by the connection of the collector of transistor 98 to the drain of p-channel transistor 95, which has its gate receiving control signal GN and its source biased to voltage $V_{ct}$. The legs are diode connected to one another by diode 103, which has its cathode connected to the collector of transistor 98 and its anode connected to the collector of transistor 102. In this example, transistor 98 is four times the size of transistor 100, allowing for selectable gain as will be described hereinbelow. The output of buffer 85, at the collector of transistor 100, is connected to the base of p-n-p output transistor 94, which has its collector connected to node SNSOUT (see also FIGS. 7 and 8). The emitter of transistor 94 is connected to the collector of pull-up p-n-p transistor 93, with its emitter at $V_{ct}$ and its base connected to its collector, in diode fashion, and to the base of transistor 102 in buffer 85.

In operation, the current in current mirror 35 is mirrored by both of transistors 98, 100, with transistor 98 conducting four times the current conducted by transistor 100. In low gain mode, transistor 95 is turned on by line GN being low, in which case diode 103 is reverse-biased (its cathode being substantially at $V_{ct}$ while its anode is at least one base-emitter drop below $V_{ct}$). Transistor 95 thus conducts the collector current through transistor 98, while transistor 102 conducts only the collector current of transistor 100 which is mirrored by transistor 93. As transistor 94 is turned on by the collector of transistor 100, the collector current through transistor 94 presented to node SNSOUT is thus limited to a current proportional to the collector current of transistor 100.

In high gain mode, transistor 95 is turned off by line GN being high. The collector current of both transistors 98 and 100 is thus conducted by transistor 102 (through diode 103), and this larger current is mirrored by transistor 93. As transistor 94 is turned on, therefore, the current presented at node SNSOUT is thus proportional to the larger current through both of transistors 98, 100 (i.e., five times that presented in the low gain mode).

Accordingly, in unipolar mode, the preferred embodiment of the invention senses the load current through center tap drive transistor 31 by way of a current mirror, and produces a signal at node SNSOUT corresponding thereto. This sensed load current is then used to control the low side drive of coils A, B, C in the manner described hereinabove.

Figure 10:
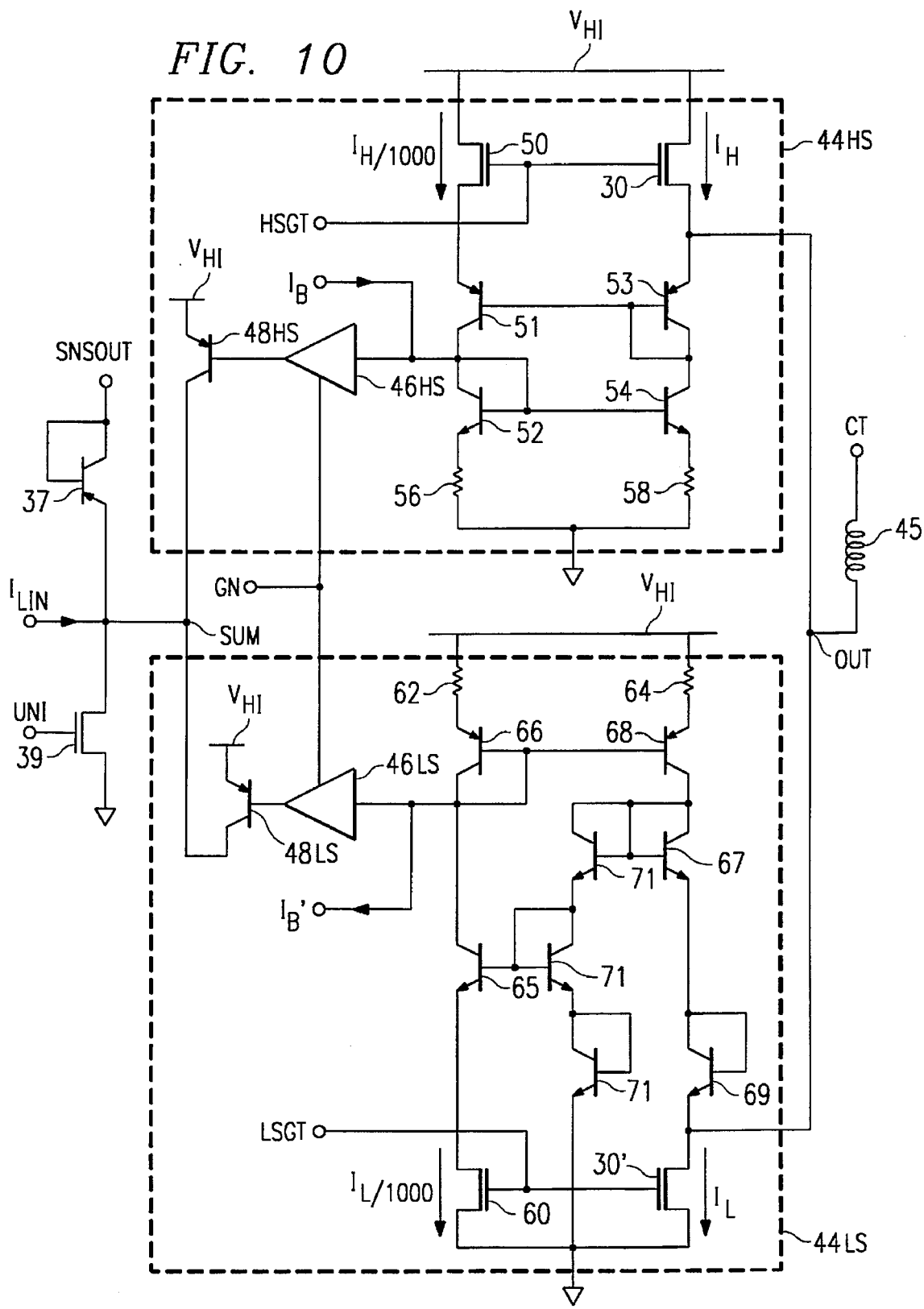
FIG. 10 is an electrical diagram, in schematic form, of high side and low side drive circuitry, with current mirror load current sensing in bipolar mode, for one of the coils in the system of FIG. 7.

Referring now to FIG. 10, the construction and operation of high side driver 44HS and low side driver 44LS, as implemented for an exemplary one of coils A, B, C, will now be described in detail, it being understood that the high side and low side drivers 44HS and 44LS, respectively, for the other coils will be similarly constructed. Coil 45, which corresponds to one of coils A, B, C of FIG. 7, is connected between center tap CT and its drive node OUT. As before, drive node OUT is connected to the source of high side drive transistor 30 in high side driver 44HS, and to the drain of low side drive transistor 30' in low side driver 44LS; the gates of high and low side drivers 30, 30' are driven by high and low side drive gate signals HSGT, LSGT, respectively.

High side driver 44HS includes current mirror transistor 50, which has its drain connected to high voltage $V_{HI}$ and its gate connected to receive high side drive gate signal HSGT. As such, mirror transistor 50 has its drain and gate connected in common with those of high side drive transistor 30. The source of high side drive transistor 30, besides being connected to node OUT, is connected to the emitter of p-n-p transistor 53, which is connected in diode fashion (base and collector tied together) to the collector of n-p-n transistor 54. The emitter of transistor 54 is connected to ground, via resistor 58, to complete the primary leg of a current mirror. The sensing leg of this current mirror includes p-n-p transistor 51 having its emitter connected to the source of current mirror transistor 50, and having its base connected to that of transistor 53. Transistors 51, 53 together are used to properly bias the transistors in the current mirror of high side driver 44HS, ensuring that the drain-source voltages of transistors 30, 50 are kept equal to one another. The collector of transistor 51 is connected to the base and collector of n-p-n transistor 52, which are connected to the base of transistor 54 in the primary leg. The sensing leg is completed by the emitter of transistor 52 being connected to ground via resistor 56.

In this embodiment of the invention, the size of mirror transistor 50 is preferably much smaller than that of high side drive transistor 30, to reduce power dissipation; in this example, the channel width of transistor 50 is one thousand times smaller than that of transistor 30 (with the same channel length for each), such that the current $I_H$ conducted by transistor 30 when gate signal HSGT is high is one thousand times that conducted by mirror transistor 50. It is preferable that mirror transistor 52 receive a small current $I_B$ to facilitate startup of the circuit.

During such commutation phases as transistors 30, 50 are turned on by high side gate signal HSGT, the load current sourced through transistor 30 is mirrored at a known fraction (e.g., one one-thousandth) through current mirror transistor 50. These currents are mirrored by transistors 52, 54, with a resulting voltage presented at the collector of transistor 52 to selectable gain current mirror buffer 46HS. The output of buffer 46HS is presented to the base of p-n-p transistor 48HS, which has its emitter biased to $V_{HI}$, and its collector connected to node SUM. The current conducted by transistor 48HS thus presents a current corresponding to that sensed by current mirror transistor 50 in high side driver 44HS of FIG. 10. Node SUM at the collector of transistor 48HS is also connected, by way of diode-connected p-n-p transistor 37, to node SNSOUT.

Figure 11:
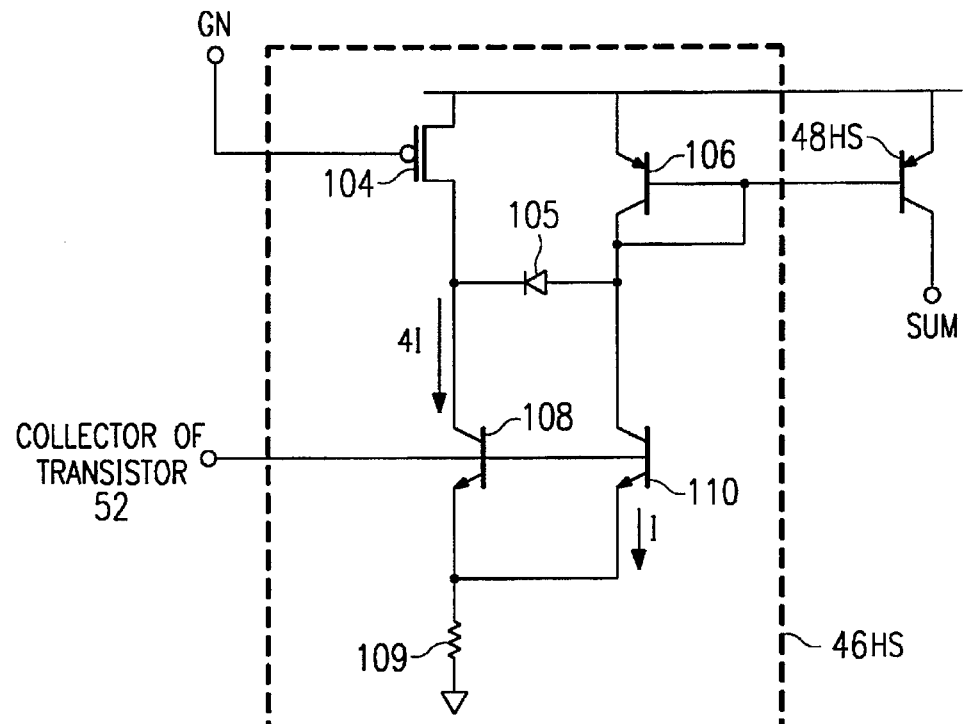
FIGS. 11 and 12 are electrical diagrams, in schematic form, of selectable gain current mirror buffer in the high side and low side drive circuits, respectively, of FIG. 10.

Referring now to FIG. 11, the construction of selectable gain current mirror buffer 46HS will be described in detail. As noted above relative to buffer 85 for the center tap circuitry, it is preferable according to this embodiment of the invention to buffer the output of the sensing current mirror by way of a second stage current mirror; in this example, the gain of the second stage current mirror in buffer 46HS is selectable, either dynamically or statically, to be in a high gain or low gain mode.

As shown in FIG. 11, the collector of transistor 52 is received at the bases of n-p-n transistors 108, 110 in two legs of buffer 46HS. Transistor 108 is preferably larger than transistor 110, for example four times as large to carry four times the current conducted by transistor 110. The emitters of transistors 108, 110 are connected in common to ground via resistor 109. The collector of transistor 110 is connected to the collector and base of p-n-p transistor 106, which has its emitter connected to $V_{HI}$. The collector of transistor 110 provides the output of buffer 46HS, and is connected to the base of transistor 48HS as will be noted below. In the other leg of buffer 46HS, the collector of transistor 108 is connected to the drain of p-channel transistor 104, which has its source biased to $V_{HI}$ and its gate receiving gain select signal GN. Diode 105 is connected between the two legs, with the anode of diode 105 connected to the collector of transistor 110 and the cathode of diode 105 connected to the collector of transistor 108.

In low gain mode, line GN is driven low to turn on transistor 104, pulling its drain substantially to $V_{HI}$. Given that at least one base-emitter voltage drop from $V_{HI}$ is present at the anode of diode 105, diode 105 is thus reverse-biased. This causes the collector current through transistor 108 to be conducted through transistor 104, resulting in only the collector current through transistor 110 to be conducted through transistor 106. The current conducted by transistor 110 is thus mirrored at the base of transistor 48HS, and corresponds to the current sensed by mirror transistor 50, as mirrored via the mirror of transistors 52, 54.

In high gain mode, line GN is driven to a high logic level to turn off transistor 104. This forward-biases diode 105 so that the current conducted by both of transistors 108, 110 is also conducted through transistor 106. As such, five times the current conducted by transistor 110 is now conducted through transistor 106 and is mirrored by transistor 48HS, thus providing a higher gain output, based on the current through mirror transistor 50, to node SUM in this mode. Of course, the amplification provided by buffer 46HS must be accounted for in the control of power stage 22.

Referring back to FIG. 10, the construction and operation of low side driver 44LS, both in its driving of node OUT and also in its current sensing technique according to this embodiment of the invention, will now be described in detail. As indicated above, low side drive transistor 30' has its source connected to ground and its drain connected to drive node OUT, with its gate controlled by low side gate signal LSGT. Low side driver 44LS includes current mirror transistor 60 which has its source connected to ground and its gate connected in common with that of transistor 30' to line LSGT. As in the case of high side driver 44HS, transistor 30' is preferably much larger than mirror transistor 60, for example having a channel width one thousand times that of transistor 60, in which case the current conducted by transistor 60 will be one one-thousandth that of low side drive transistor 30'.

In the primary leg of a current mirror in low side drive circuit 44LS, the drain of transistor 30' is connected to the emitter of n-p-n transistor 69 having its base and collector connected together in diode fashion. The base and collector of transistor 69 are connected to the emitter of n-p-n transistor 67 which is similarly connected in diode fashion, and connected to the collector of p-n-p transistor 68 which is in another current mirror arrangement. The emitter of transistor 68 is connected to $V_{HI}$ via resistor 64, to complete this primary leg. The mirror leg of this current mirror is implemented by the connection of the drain of mirror transistor 60 to the emitter of n-p-n transistor 65. The collector of transistor 65 (at which the output of this current mirror is presented) is connected to the base and collector of p-n-p transistor 66, and thus to the base of transistor 68 in the primary leg. The emitter of transistor 66 is connected to $V_{HI}$ by way of resistor 62 to complete the mirror leg.

In this preferred embodiment of the invention, a current path is provided for those times in the commutation sequence, both in bipolar and unipolar mode, during which transistor 30' has a large drain voltage, to prevent saturation of mirror transistors 66, 68. This current path is provided by a chain of n-p-n transistors 71 that are connected in diode fashion between the collector of current mirror transistor 68 and ground. In this embodiment of the invention, the base of transistor 65 is connected to the base and collector of one of transistors 71; such connection is useful to ensure that the drain-source voltage of transistors 30', 60 remain equal when turned on (given the presence of transistor 69 in the primary leg). In this embodiment of the invention, during such time as transistor 30' is turned off, current will conduct from $V_{HI}$ through resistor 64, and transistors 68, 71 to ground. In addition, it is preferred that a small current $I_B$, (e.g., on the order of 1 μA) be sinked from the collector of transistor 65, to provide reliable startup of the current mirror.

According to this construction, load current conducted by low side drive transistor 30' is sensed by mirror transistor 60 and, by operation of the current mirror of transistors 66, 68, a signal corresponding to the mirrored current is presented to the input of selectable gain current buffer 46LS, the construction of which will be described in detail hereinbelow. The output of buffer 46LS is presented to the base of p-n-p transistor 48LS, which has its emitter biased to $V_{HI}$ and its collector connected to node SUM, along with the collector of high side output transistor 48HS described above.

Figure 12:
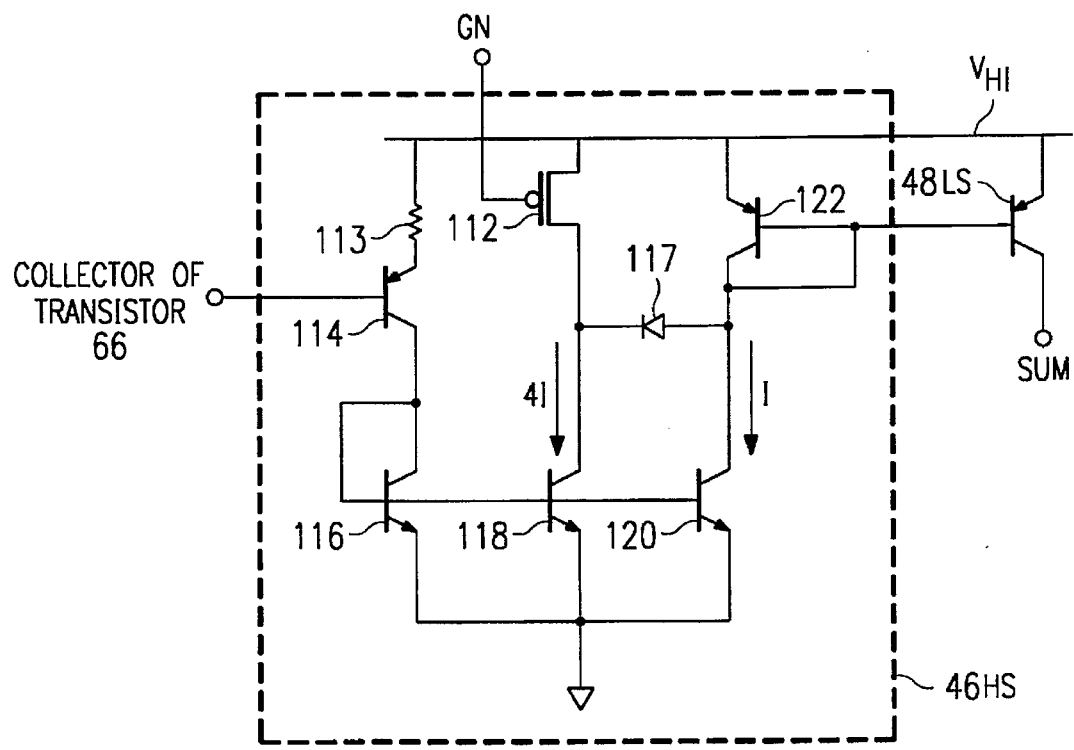

Referring now to FIG. 12, the construction and operation of low side selectable gain current mirror buffer 46LS will now be described in detail. As shown in FIG. 12, the collector of transistors 66 is received at the base of p-n-p transistor 112, which has its emitter biased to $V_{HI}$ through resistor 112. The collector of transistor 112 is connected to the collector and base of n-p-n transistor 116, which has its emitter biased to ground. The base of transistor 116 is connected in common with the bases of n-p-n transistors 118, 120, each of which also have their emitters grounded, and which establish two current mirror legs in buffer 48LS. According to this embodiment of the invention, similarly as described hereinabove for buffers 48HS and 85, transistor 118 is preferably larger than transistor 120, for example by a factor of four, to allow for selectable gain controlled by line GN. In this example, the collector of transistor 118 is connected to the drain of p-channel transistor 112, which has its source biased to $V_{HI}$ and its gate receiving line GN. Transistor 120, on the other hand, has its collector connected to the collector and base of p-n-p transistor 122, which has its emitter biased to $V_{HI}$; this node at the collector of transistor 120 is also connected to the anode of diode 117, which has its cathode connected to the collector of transistor 118. The output of buffer 46LS, at the collectors of transistors 120, 122 (as well as the base of transistor 122), is connected to the base of transistor 48LS.

In operation, the voltage at the collector of transistor 66 controls the current through transistor 116, which is mirrored by transistors 118, 120. As noted above, in this example transistor 118 conducts four times the current of transistor 120. In low gain mode, line GN is at a low logic level to turn on transistor 112, pulling the collector of transistor 118 to a voltage near $V_{HI}$. Since transistor 122 causes at least one base-emitter voltage drop from $V_{HI}$ to be present at the collector of transistor 120, diode 117 is reverse-biased in this case. The current conducted by transistor 118 is thus also conducted by transistor 112, and only the current conducted by transistor 120 is conducted by transistor 122. As a result, transistor 48LS conducts a current corresponding to that conducted by transistor 120 to node SUM.

In high gain mode, line GN is at a high logic level, turning off transistor 112. In this case, diode 117 is forward-biased, such that transistor 122 conducts the current conducted by both of transistors 118, 120. In this example, where transistor 118 is four times the size of transistor 120, transistor 122 will conduct five times the current in high gain mode than in low gain mode. The current through transistor 122 is again mirrored by transistor 48LS, for application to node SUM.

Of course, line GN is connected in common to both high side buffer 46HS and low side buffer 46LS, such that either both or neither of buffers 46 are in high gain mode at any one time.

Referring back to FIG. 10, it will now be understood that the currents presented by buffers 46HS and 46LS are effectively summed at node SUM. Transistor 39 is connected between node SUM and a reference voltage, such as ground, and has its gate controlled by unipolar request signal UNI. In this embodiment of the invention, a small bias current $I_{LIN}$ is also sourced into node SUM for each driver leg, to ensure that the operating point of the circuit remains in a linear region. The current $I_{LIN}$ is preferably small enough (e.g., 10 µA, where the summed sensed currents are on the order of milliamperes) as to not introduce measurable error into the circuit. As such, transistor 39 is off in bipolar mode, allowing the summed currents at node SUM to be presented to sense output node SNSOUT via diode 37. In unipolar mode, line UNI will be high, turning on transistor 39, effectively acting as a shorting transistor, and thus grounding node SUM; node SUM is also isolated from node SNSOUT by operation of diode 37.

Accordingly, in bipolar mode, the high side and low side load currents are sensed and communicated, in current mirror fashion, at a node SUM for each of the driven coils, with the nodes SUM from all three (or more) coils summed together at node SNSOUT. The summing of sensed currents for each coil, in bipolar mode, provides the additional benefit of reducing the ripple effect produced by commutation. With reference to Table 1 above, one may readily observe that only one of the two drivers changes in each commutation advance, and as such the current in only one of the driver and coil legs changes for each phase change. As a result, the sense current at node SNSOUT in bipolar mode never totally disappears, which ensures that current readings are maintained continuously for all phases of motor operation.

In unipolar mode, of course, line UNI is at a high logic level which turns on transistor 39 for each of the driver legs (see FIGS. 7 and 10). In this case, current mirror sensing is enabled only at the center tap; since all load current is conducted by center tap drive transistor 31, this arrangement provides accurate measurement of the load current for all commutation phases, via a transistor (31) that is not commutated. Ripple effects in the sensed current are thus avoided.

While the invention has been described herein relative to its preferred embodiment, it is of course contemplated that modifications of, and alternatives to, this embodiment, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A drive circuit for a brushless motor having a plurality of coils arranged in a "Y" configuration, comprising:

a plurality of first drive transistors, each having a conduction path connected between an associated one of said plurality of coils and a first voltage, and each having a control electrode;

a center tap drive transistor, having a conduction path connected between a center tap of the "Y" configuration and a power supply voltage, and having a control electrode;

a center tap current mirror transistor, having a conduction path connected to the power supply voltage, and having a control electrode connected in common with the control electrode of said center tap drive transistor;

a sequencer, for sequentially controlling the control electrodes of each of said plurality of first drive transistors so that at least one of said plurality of first drive transistors is energized in each phase of a commutation sequence; and a center tap current mirror amplifier connected to the conduction paths of each of said center tap drive transistor and said center tap current mirror transistor, for generating a signal at an output thereof corresponding to the load current conducted by said center tap drive transistor.

2. The drive circuit of claim 1, further comprising:

an amplifier, having a first input coupled to receive the signal at the output of said center tap current mirror amplifier, and having an output coupled to the control terminal of a one of said plurality of first drive transistors which is energized in each commutation phase.

3. The drive circuit of claim 1, further comprising:

a plurality of second drive transistors, each coupled between a second voltage, and each having a control electrode; and circuitry connected to receive an external request signal indicating whether the drive circuit is to operate in a unipolar mode or in a bipolar mode, and connected to pass said request signal to said sequencer;

wherein said sequencer is also for energizing each of said plurality of second drive transistors so that at least one of said plurality of second drive transistors is energized in each phase of a commutation sequence in bipolar mode;

and wherein said center tap drive transistor is turned off in bipolar mode, and turned on in a unipolar mode.

4. The drive circuit of claim 3, further comprising:

a plurality of first current mirrors, each associated with one of said plurality of first drive transistors, for sensing the load current through its associated first drive transistor; and a plurality of second current mirrors, each associated with one of said plurality of second drive transistors, for sensing the load current through its associated second drive transistor.

5. The drive circuit of claim 4, wherein each of said plurality of first current mirrors comprises:

a first current mirror transistor having a conduction path and a control electrode connected in common with its associated first drive transistor; and a first current mirror amplifier having an input coupled to an associated first current mirror transistor, and having an output;

and wherein each of said plurality of second current mirrors comprises:

a second current mirror transistor having a conduction path and a control electrode connected in common with its associated second drive transistor; and a second current mirror amplifier having an input coupled to an associated second current mirror transistor, and having an output.

6. The drive circuit of claim 5, wherein, for each of said coils, the output of the first current mirror amplifier and the output of the second current mirror amplifier are coupled together at a first sum node to produce a signal corresponding to the sum of the current conducted by the associated first and second drive transistors for that coil;

and further comprising:

an amplifier, having a first input coupled to receive the signal at the output of said center tap current mirror amplifier and also coupled to the first sum node, and having an output coupled to the control terminal of the one of said plurality of first drive transistors energized in each commutation phase;

a shorting transistor associated with each of said plurality of coils, having a conduction path coupled between the first sum node for the associated coil and a reference voltage, and having a control electrode coupled to receive the request signal in such a manner that the shorting transistor is turned on in unipolar mode.

7. The drive circuit of claim 6, wherein the first summed signals of the first and second current mirror amplifiers are summed together at a sense output node, at a second sum node, at which a signal is generated corresponding to the sum of the current conducted by the associated first and second drive transistors for the plurality of coils.

8. The drive circuit of claim 1, wherein the plurality of first driver transistors are each of field-effect type.

9. A method of controlling the drive of a plurality of coils in a motor, comprising:

commutating a plurality of first drive transistors in a unipolar mode, each of said plurality of first drive transistors connected between one of the plurality of coils and a first voltage, so that current flows through a center tap drive transistor between a center tap and one of the plurality of first drive transistors in each phase of a commutation sequence;

sensing load current through the center tap drive transistor with a center tap current mirror transistor connected in current mirror fashion therewith;

amplifying the sensed load current through the center tap drive transistor to produce a current feedback signal; and controlling the drive of the commutated one of the plurality of first drive transistors responsive to the current feedback signal.

10. The method of claim 9, further comprising:

enabling motor operation in unipolar mode, prior to said commutating step.

11. The method of claim 10, further comprising:

prior to said enabling step, turning off the center tap drive transistor; and prior to said enabling step, commutating the plurality of first drive transistors and a plurality of second drive transistors in a bipolar mode, each of said plurality of second drive transistors connected between one of the plurality of coils and a second voltage, so that current flows between the first and second voltages through one of the first drive transistors and its associated coil and one of the second drive transistors and its associated coil.

12. The method of claim 11, further comprising:

after said step of commutating the plurality of first drive transistors and a plurality of second drive transistors in a bipolar mode, and prior to said step of commutating the plurality of first drive transistors in the unipolar mode, turning on the center tap drive transistor.

13. The method of claim 11, further comprising:

during said step of commutating the pluralities of first and second drive transistors in bipolar mode, sensing load current through each of the first drive transistors with a plurality of first current mirror transistors, each connected in current mirror fashion with an associated first drive transistor; and during said step of commutating the pluralities of first and second drive transistors in bipolar mode, sensing load current through each of the second drive transistors with a plurality of second current mirror transistors, each connected in current mirror fashion with an associated second drive transistor.

14. The method of claim 13, further comprising:

for each of said plurality of coils, summing the sensed load current through its first drive transistor with the sensed load current through its second drive transistor at a first sum node; and summing each of the summed currents at the first sum nodes for all of the plurality of coils.

15. The method of claim 14, further comprising:

after said step of turning on the center tap drive transistor, connecting the first sum nodes to a reference voltage.

16. A motor system, comprising:

a brushless motor having a plurality of coils arranged in a "Y" configuration;

a plurality of first drive transistors, each having a conduction path connected between an associated one of said plurality of coils and a first voltage, and each having a control electrode;

a center tap drive transistor, having a conduction path connected between a center tap of the "Y" configuration and a power supply voltage, and having a control electrode;

a center tap current mirror transistor, having a conduction path connected to the power supply voltage, and having a control electrode connected in common with the control electrode of said center tap drive transistor;

a sequencer, for sequentially controlling the control electrodes of each of said plurality of first drive transistors so that one of said plurality of first drive transistors is energized in each phase of a commutation sequence; and a center tap current mirror amplifier connected to the conduction paths of each of said center tap drive transistor and said center tap current mirror transistor, for generating a signal at an output thereof corresponding to the load current conducted by said center tap drive transistor.

17. The system of claim 16, further comprising:

an amplifier, having a first input coupled to receive the signal at the output of said center tap current mirror amplifier, and having an output coupled to the control terminal of the one of said plurality of first drive transistors energized in each commutation phase.

18. The system of claim 17, further comprising:

a plurality of second drive transistors, each coupled between a second voltage between an associated one of said plurality of coils and a second voltage, and each having a control electrode; and an input for receiving a request signal indicating whether the drive circuit is to operate in a unipolar mode or in a bipolar mode;

wherein said sequencer is also for energizing each of said plurality of second drive transistors so that one of said plurality of second drive transistors is energized in each phase of a commutation sequence in bipolar mode;

and wherein said center tap drive transistor is turned off in bipolar mode, and turned on in a unipolar mode.

* * * * *